United States Patent [19]

Terentieva et al.

[11] Patent Number: 5,677,060
[45] Date of Patent: Oct. 14, 1997

[54] METHOD FOR PROTECTING PRODUCTS MADE OF A REFRACTORY MATERIAL AGAINST OXIDATION, AND RESULTING PROTECTED PRODUCTS

[75] Inventors: Valentina Sergeevna Terentieva; Olga Petrovna Bogachkova; Elena Valentinovna Goriatcheva, all of Moscow, Russian Federation

[73] Assignee: Societe Europeenne de Propulsion, Suresnes, France

[21] Appl. No.: 545,806

[22] PCT Filed: Mar. 10, 1995

[86] PCT No.: PCT/FR95/00279

§ 371 Date: Nov. 8, 1995

§ 102(e) Date: Nov. 8, 1995

[87] PCT Pub. No.: WO95/24364

PCT Pub. Date: Sep. 14, 1995

[30] Foreign Application Priority Data

Mar. 10, 1994 [RU] Russian Federation ............ 94/008267

[51] Int. Cl.$^6$ .................................................. C23C 26/00
[52] U.S. Cl. .................... 428/408; 428/446; 428/457; 428/469; 428/472; 428/697; 428/698; 428/701; 428/702; 428/704; 156/89; 427/228; 427/397.7

[58] Field of Search ...................... 428/408, 698, 428/446, 457, 469, 472, 677, 658, 701, 702, 704; 156/89; 427/228, 397.7

[56] References Cited

U.S. PATENT DOCUMENTS

| | | | |
|---|---|---|---|
| 3,854,892 | 12/1974 | Burgess et al. | 29/196.1 |
| 4,190,493 | 2/1980 | Patel | 75/252 |
| 5,079,195 | 1/1992 | Chiang et al. | 428/408 |

*Primary Examiner*—Archene Turner
*Attorney, Agent, or Firm*—Weingarten, Schurgin, Gagnebin & Hayes LLP

[57] ABSTRACT

A coating for providing anti-oxidation protection is formed at least on the surface of the material and it comprises a refractory phase which is formed mainly of the refractory silicide $Ti_{(0.4-0.95)}Mo_{(0.6-0.05)}Si_2$, and which has a branching microstructure forming an armature within which a healing phase is distributed that is constituted by a eutectic which is formed mainly of unbound silicon, of the silicide $Ti_{(0.4-0.95)}Mo_{(0.6-0.05)}Si_2$, and of at least the disilicide $TiS_2$. The coating is obtained from a mixture of powders that is deposited on the surface of the material and that is subjected to heat treatment under an inert atmosphere.

27 Claims, No Drawings

METHOD FOR PROTECTING PRODUCTS MADE OF A REFRACTORY MATERIAL AGAINST OXIDATION, AND RESULTING PROTECTED PRODUCTS

The present invention relates to protecting products made of refractory material against oxidation.

The term "refractory materials" is used herein to designate, in particular, refractory metals or metal alloys such as alloys based on niobium or based on molybdenum, tungsten, and/or tantalum, or refractory composite materials such as carbon-carbon composite materials or composite materials having a ceramic matrix, e.g. carbon-SiC (silicon carbide) composite materials. Such refractory materials are used, in particular, in the aviation or space industries to make parts that are subjected in operation to high temperatures, such as parts of aero-engines or elements of aerodynamic fairings (space vehicles).

A severe drawback common to the above-mentioned refractory materials is their poor resistance to oxidation, even when exposed to medium temperatures. This considerably limits the possibility of using them in an oxidizing medium at high temperature under static conditions, and makes such use practically impossible under aerodynamic conditions unless protection is provided against oxidation.

The state of the art concerning protecting refractory materials against oxidation is most abundant, in particular for composite materials containing carbon. The term "composite material containing carbon" is used herein to designate a composite material in which carbon is present in the reinforcing elements, e.g. in the form of carbon fibers, or in the matrix, or in an intermediate layer or "interphase" between the reinforcing elements and the matrix.

Generally, a protective coating is formed on the surface of the refractory material, the coating comprising a continuous layer of ceramic that withstands oxidation and that constitutes a barrier against the oxygen of the surrounding medium. The ceramic used may be a carbide, a nitride, a silicide, or an oxide. However, such a ceramic layer is inevitably subject to cracking. Microcracks appear in use because of the mechanical stresses imposed and/or the difference between the thermal expansion coefficients of the refractory material and of the protective coating. Similar defects may even appear while the ceramic layer is being made. The cracks provide the oxygen in the surrounding medium with direct access to the underlying refractory material.

To solve that problem, it is well known to make the coating so that it forms an outer surface layer that has healing properties, or to add such a layer to the ceramic layer. While the material is being used, variations in thermal and mechanical stresses give rise to variations in the shape of the cracks, particularly to their edges moving away from and towards each other. The term "healing layer" is used herein to designate a layer that is capable, under the conditions of use of the refractory material, of stopping, filling, or sealing the cracks while following the movements of the cracks, and capable of doing this without itself cracking. That is why the healing layer is usually made of substances that constitute a glass, or that are suitable for constituting a glass under the effect of oxidation, the glass being selected so as to exhibit viscous behavior at the working temperature of the material.

Thus, it is known that using a protective coating based on silicides provides protection against oxidation at high temperatures because a surface film is formed that is based on silica as a result of oxidizing the silicon contained in the coating. In use, the silica-based film continuously re-constitutes itself, so long as a sufficient quantity of oxygen is supplied. The silica base has a healing function because it passes to the viscous state at high temperatures. It has nevertheless appeared that in the presence of very high energy heat flows at high speed, e.g. in the combustion chamber of a direct air flow hypersonic jet engine, the silica film does not always regenerate quickly enough. The presence of intense heat flows that are localized, particularly in zones having surface defects, at sharp edges, and also in the zones of incidence of shockwaves, can give rise to rapid destruction of the surface oxide film and to combustion of the refractory material, which combustion can be self-sustaining when the oxidation reaction is highly exothermal.

In addition, a healing surface layer or film generally presents lower resistance to erosion than does the ceramic coating, and in the viscous state it runs the risk of being swept away. Unfortunately, in certain applications, in particular for parts of aero-engines or for fairing elements of space aircraft, the surface of the material is subjected to a gas flow that produces such a sweeping effect. This happens whether the healing surface layer is produced and regenerated by oxidizing components of the protective coating, or whether it is deposited in the form of an additional layer on the ceramic coating.

To overcome that difficulty, document EP-A-0 550 305 proposes making anti-oxidation protection by means of a healing phase and a refractory ceramic phase such as a carbide, a nitride, a silicide, or a baride, the phases constituting two inter-penetrating arrays. The protection is made on the surface of the product by depositing a mixture comprising: a refractory ceramic in finely divided form; at least one refractory oxide likewise in finely divided form and providing healing properties by forming a glass; and a binder constituted by a polymer that is a precursor for a refractory ceramic. By being cross-linked prior to transformation into a ceramic, the polymer makes it possible to establish a three-dimensional array that holds in place bath the refractory ceramic component and the oxide component (s) of the healing phase. After the precursor polymer has been transformed into a ceramic, heat treatment performed at a temperature higher than the melting or softening temperature of the particles of the healing phase enables the healing phase fillers to bond together. This forms a continuous healing phase that is interpenetrated with the refractory ceramic phase, and that is thus made more suitable for withstanding abrasion and being swept away.

However, it is desirable, and this is the object of the invention, to further improve the performance of anti-oxidation protection to make it possible to use refractory materials at very high temperatures, typically with the material having a surface temperature of up to at least 1850° C., and also to guarantee that the healing function is continuous, even in surface zones which, because of their configuration or their location, are exposed to intense heat flows or to gas flows at very high speed.

According to the invention, this object is achieved by a coating for protection against oxidation that comprises a refractory phase that presents a branching microstructure forming an armature within which a healing phase is distributed, the armature-forming refractory phase is mainly formed of the mixed refractory disilicide $Ti_{(0.4-0.95)}Mo_{(0.6-0.05)}Si_2$; and the healing phase is constituted by a eutectic which is formed mainly of unbound silicon, of the mixed disilicide $Ti_{(0.4-0.95)}Mo_{(0.6-0.05)}Si_2$ and of at least the disilicide $TiSi_2$.

The healing phase may further include at least one disilicide MeSi$_2$ where Me is a metal taken from groups 3 to 8 of the periodic classification of the elements (IUPAC standard).

The protective coating further includes a surface oxide film comprising the silica obtained by oxidizing the silicon and the silicides contained in the coating. The protective coating may further include an outer refractory layer. This may be a layer comprising at least one oxide such as a layer of silica, alumina, or zirconia glass, or a layer of a non-oxide ceramic such as silicon carbide (SIC) or silicon nitride (Si$_3$N$_4$) e.g. obtained by chemical vapor deposition.

The exceptional properties of the coating come from the particular compositions of the armature of the protective coating and of the eutectic uniformly distributed within the armature, in association with the generation of a surface oxide film. These properties include, in particular, the ability of the coating to provide protection against oxidation at surface temperatures that may be as high as at least 1850° C. and for parts having configurations and conditions of use that are most unfavorable. Performance is enhanced by the self-healing ability of the coating provided:

firstly, by the self-regenerating surface oxide film which is constituted essentially by amorphous silica doped with other components of the coating; and secondly, by the eutectic which constitutes one of the structural elements of the coating and which, because of the respective compositions thereof, presents good adhesion to the other structural component of the coating that forms the armature; incidentally, it may be observed that this adhesion contributes to increasing the resistance to being swept away, since the armature retains the eutectic effectively even when the temperature exceeds the melting point of the latter.

The silicide-based armature of the coating remains homogeneous over a large temperature range and also has the ability to accumulate dopants, in particular niobium, tungsten, or tantalum coming from the underlying refractory material when the latter comprises an alloy of one of said elements.

In addition to its healing function, the eutectic makes it possible to accelerate the formation and the regeneration of the surface oxide film based on amorphous silica, in particular by facilitating migration, towards the surface, of silicon or other dopants that are included in the composition of the oxide film. Amongst such dopants, boron and yttrium contribute to facilitating the formation of a uniform surface film having improved protective ability. Boron and yttrium may be present in the coating in the form of YSi$_2$, titanium boride, and/or yttrium boride.

The performance of the anti-oxidation protection obtained by the invention makes it possible to envisage using refractory materials provided with said protection in applications such as hypersonic jet engines and aero-spacecraft where operation conditions can be very severe. Thus, without requiring complex and expensive cooling systems, it is possible to make parts for hypersonic jet engines or reaction chamber surface portions having sharp edges that are the site of intense localized thermal phenomena. In addition, it is also possible to make aerodynamic fairing elements for aero-spacecraft, such as the leading edges of the wings or the nose, in particular for space airplanes which are subjected to intense heat flows.

Another advantage of the invention is that the protective coating against oxidation can also be used for protecting refractory metal alloys, in particular alloys of niobium, of molybdenum, of tungsten, or of tantalum, and intermetallic compounds or alloys containing dispersed oxide phases, as well as for protecting refractory composite materials, in particular composite materials containing carbon such as carbon-carbon or carbon-SiC composites, or for providing anti-ignition protection or oxygen compatibility for metals such as aluminum, titanium, or nickel, as well as for their alloys and for their intermetallic compounds and alloys of the type TiAl, Ti$_3$Al, TiAl$_3$, NiAl, and Ni$_3$Al.

Another object of the invention is to provide a method enabling the above-defined anti-oxidation protective coating to be made.

According to the invention, such a method comprises the following steps:

preparing a mixture containing powders having the following composition in percentage by weight:
Ti: 15% to 40%
Mo: 5.0% to 30%
Cr: 0 to 8%
Y: 0% to 1.5%
B: 0% to 2.5%
Me: 0% to 10%, where Me is at least one metal other than Ti, and taken from groups 3 to 8 of the periodic classification of the elements
Si: balance needed in order to reach 100% depositing the mixture on the surface of the material to be protected; and performing at least one heat treatment at a temperature that is not less than the melting point of the eutectic of the coating.

Me is preferably selected from Mn, Fe, Co, and Ni.

The heat treatment comprises a first step under vacuum enabling the desired protective coating to be formed and enabling the coating to adhere to the surface of the material to be protected, and a second step performed in an oxidizing medium to enable an oxide film to be formed on the surface of the coating. The first step is performed at a temperature that is equal to or greater than the melting point of the eutectic, generally in a range of about 1300° C. to about 1600° C. The second step is performed in an oxidizing medium at a temperature lying in the range about 1200° C. to 1600° C., and preferably at least 1300° C. The second step, whose purpose is to achieve pre-oxidation, is not necessarily performed prior to the material being used, since it can take place on the first occasion that the material is put into operation.

A refractory outer layer may also be deposited on the surface of the material provided with the anti-oxidation coating. This outer layer may be formed by at least one refractory oxide, such as silica, alumina, or zirconia glass, or by a non-oxide ceramic, such as SiC or Si$_3$N$_4$, e.g. obtained by chemical vapor deposition.

A preferred composition in percentage by weight of the powder mixture is as follows:
Ti: about 30%
Mo: about 10%
Cr: about 0.2%
Y: about 0.5%
B: about 2%
Me: about 7%
Si: balance needed in order to reach 100%, in which composition Me is preferably iron.

Various techniques may be used for depositing the powder mixture on the surface of the refractory material.

The powder mixture is preferably put into suspension in a liquid, e.g. water, possibly also containing a dispersing wetting agent and/or a transient organic binder such as a cellulose varnish, a polymer of the polyvinyl alcohol type, etc., so as to make deposition possible by immersion, by brushing, or by spraying in air, which technique has the advantage of being simple, quick, and cheap.

However other techniques for depositing the powder mixture can be used, such as cold supersonic spraying, spraying by explosion, or thermal spraying, in particular plasma spraying.

The thickness of the deposited layer is selected as a function of the thickness desired for the protective coating.

In general, this thickness is greater than 10 µm and is preferably at least 60 µm to 100 µm depending on the surface configuration of the material (sharp edge or plane surface).

The application of this type of protection to porous materials also includes the possibility of the protection not being limited solely to protecting the geometrical surface thereof, but also impregnating and filling all or part of the accessible pores of the materials. This applies, for example, to composite materials such as carbon-carbon composites, and ceramic matrix composites which present residual porosity, and porous metals in the form of foams or fibers.

Two implementations of the present invention are described below by way of non-limiting example.

EXAMPLE 1

Samples in the form of disks having a diameter of 20 mm and a thickness of 1.5 mm were made of a refractory material formed by a niobium alloy and having the following composition (percentages by weight):

Mo: 4.6%

Zr: 1.4%

C: 0.12%

$O_2$: 0.02%

$H_2$: 0.05%

Nb: balance needed in order to reach 100%.

A coating composition was prepared in the form of a mixture of powders in the finely divided state, the average size of the powder particles being about 10 µm. The composition of the powder mixture in percentage by weight was as follows:

Ti: 30%

Mo: 10%

Cr: 0.2%

Y: 0.5%

B: 2.0%

Fe: 7%

Si: balance needed in order to reach 100%,

The powder mixture was put into suspension in water, the ratio by weight between the material in suspension and the water being 1/1, and it was brushed onto the surface of the samples. After drying in air for 40 minutes, it was subjected to heat treatment under a vacuum (about 0.65 Pa) at a temperature of 1420° C. for 8 minutes. That heat treatment served to obtain the desired coating based on silicides with a thickness that was substantially uniform and with adhesion to the surface of the material to be protected. The thickness of the coating was 90 µm to 110 µm on various different samples.

Thereafter, oxidation in atmospheric air was performed at a temperature of 1300° C. for 30 minutes, resulting in the formation of a surface film of oxide.

The samples protected in this way were subjected to thermal cycles including thermal shock, each cycle comprising an increase in temperature from 20° C. to 1600° C. in 5 seconds, a cooling down to 1300° C. over 30 seconds, a holding of temperature at 1300° C. for 20 minutes, and a cooling in air from 1300° C. to 20° C. All of the samples were subjected to 50 cycles.

Thereafter, the samples were kept in an oven at 1300° C. for 100 hours in air with natural convection. By measuring the weight loss of each sample, it was found that the oxidation rate was $4.6 \times 10^{-2}$ $kg/m^2 \cdot h$.

The samples were then exposed to a temperature of 1775° C. for 2 hours to verify that they were operative at that temperature. No sign of oxidation appeared on the surface of the samples.

The samples were also tested by being placed in a gas flow containing the combustion products of a fuel. The flow speed was Mach 2.5, the surface temperature of the samples was 1675° C., and the ratio h/Cp was about 10 $kg/m^2 \cdot s$, where h is the heat transfer coefficient and Cp is the specific heat. When the gas flow was directed perpendicularly to the plane surface of the samples, no destructive effect was observed after 500 seconds, and when the gas flow was directed at the edges of the samples, no destructive effect was observed after 60 seconds. By way of comparison, samples of the same niobium alloy but not provided with the protective coating were destroyed in a few seconds when subjected to this test.

EXAMPLE 2

Parallelepiped samples having the dimensions 60 mm×10 mm×3 mm were cut from a plate of carbon-carbon (C—C) composite material having reinforcement, comprising superposed layers of carbon fabric, and a carbon matrix. The samples were coated in a thin layer of silicon carbide (SIC) obtained by chemical vapor deposition, for example.

A mixture was prepared of finely divided powders having a mean particle size of about 10 µm. The composition of the powder mixture in percentage by weight was as follows:

Ti: 30%

Mo: 10%

Y: 0.5%

B: 1.5%

Fe: 7%

Mn: 1.5%

Si: balance needed in order to reach 100%.

The powder mixture was put into suspension in an ethylsilicate based binder having a ratio by weight of material-in-suspension to liquid vehicle of 1/1. The suspension was brushed onto all of the faces of the samples.

After drying in air for 1 hour, heat treatment was performed under a vacuum (about 0.013 Pa) at 1440° C. for 5 minutes. There was thus obtained a silicide-based coating fitting closely to the surface of the composite material and adhering thereto, the thickness of the coating varying over the range 85 µm to 115 µm.

Oxidation treatment in air was then performed at a temperature of 1300° C. for 30 minutes to form a surface oxide film.

The samples protected in this way were tested by thermal cycling under a flow of air heated in a high frequency induction plasma torch ("Plasmatron"). The characteristics of the torch and the test conditions were as follows: flow speed 1670 meters per second (m/s); flow temperature 2153° C.; torch power 35 kW; flow pressure 38 Pa to 90 Pa; pressure behind the shockwave 0.2 MPa; Mach number 1.9; distance between the nozzle and the sample 105 mm; area of the heated zone on the sample 78.5 $mm^2$; flow perpendicular to the main surface of the sample. Thermal cycling was performed with thermal shock in accordance with the following conditions: 5 seconds of heating from ambient temperature to 1700° C.; 10 second pause; and cooling to about 125° C. to 225° C. After 20 cycles, none of the tested samples had been destroyed. The measured mass loss rate of the coating was 0.0009 kg/m²·s for the entire duration of the tests.

Other samples provided with the protective coating were tested under a flow of hot air heated in the same heating device. Two successive test cycles were performed under the following conditions respectively: air flow speed 90 m/s and 95 m/s; flow enthalpy 5900 kJ and 6200 kJ; stop point temperature 3200° C. and 3350° C.; ratio of h/Cp 0.62 kg/m²·s and 0.66 kg/m²·s; distance between the nozzle and the sample under test 60 mm and 75 mm; heat flux on hot wall 2420 kW/m² and 2680 kW/m²; temperature at the center of the hot point on the surface of the sample during the test cycle 1780° C. and 1710° C.; and pauses at 1780° C. for 53 seconds and at 1710° C. for 36 seconds. No sample destruction was observed during the tests. By way of comparison, similar tests performed on similar samples of carbon-carbon composite material with SiC coating but without the protective coating of the invention always caused the samples to be destroyed.

Above Examples 1 and 2 show that the protection against oxidation as provided by the present invention is remarkably effective, and that this applies at high temperatures for parts of unfavorable configuration (sharp edges) and under conditions that are very severe (corrosive gas flows at high speed).

EXAMPLE 3

Samples of C—SiC composite material in the form of disks have a diameter of 25 mm and a thickness of 3 mm were made using a reinforcement based on carbon fibers and a matrix of SiC obtained by chemical vapor infiltration.

The samples were then coated on all their faces by being painted with the suspension described in Example 2 and they were heat-treated using the same protocol at 1440° C. for 5 minutes.

The thickness of the resulting coating was about 100 µm.

The samples were placed perpendicularly in the gas flow from an air plasma torch having the following operating characteristics:

gas speed: Mach 4.5 to 5
temperature: 7000K
degree of dissociation: 0.8%
degree of ionization: 0.1%.

The protected samples were inserted in the gas flow for a period of 70 minutes during successive tests in which the distance between the torch and the test piece was adjusted to vary the surface temperature of the sample.

After each test, the relative change $\Delta m/m$ in the mass of the sample was measured (a negative value corresponding to carbon being oxidized), thereby measuring the degree of protection provided.

For various sample surface temperatures T and pressures P, the following were obtained:

at T=1100° C. and P=67 kPa: $\Delta m/m$=+0.06%
at T=1440° C. and P=160 kPa: $\Delta m/m$=+0.27%
at T=1500° C. and P=240 kPa: $\Delta m/m$=−1.12%

These results show the effectiveness of the protection when subjected to high temperature in a gas flow at very high speed. By way of comparison, the same material without protection was destroyed before the end of the 70 minute cycle.

One of the special characteristics of this coating when placed under such conditions is to have very low catalysity Kw equal to 2 m/s up to 1200° C. and not exceeding 6 m/s at 1600° C. In association with high emissivity (0.85 at 1100° C.) this makes the anti-oxidation protection particularly advantageous for protecting structures for re-entry into planetary atmospheres.

EXAMPLE 4

A traction test piece having a length of 220 mm and a working section of 20 mm×3.6 mm and made of C—SiC composite material was made and protected as in Example 3.

The test piece was placed in the air plasma torch described in Example 3 so that the body of the test piece was uniformly heated while a traction force was simultaneously exerted on the test piece corresponding to a stress of 80 MPa. After five 20-minute tests (i.e. 100 minutes) under stress at 1350° C. and under a pressure P=160 kPa, the test piece had not broken and its change in mass was negligible.

At 1500° C. and under a pressure P=386 kPa, the test piece had still not broken after being subjected to stress for 1 hour.

This shows the ability of the anti-oxidation protection to protect a refractory material subjected to heat and to high mechanical stresses.

EXAMPLE 5

Samples in the form of disks having a diameter of 20 mm and a thickness of 1.5 mm were made of refractory material constituted by a niobium alloy having the following composition (in percentage by weight):

Mo: 4.6%
Zr: 1.4%
C: 0.12%
$O_2$: 0.02%
$H_2$: 0.05%
Nb: balance needed in order to reach 100%.

A coating composition was prepared in the form of a mixture of powders in the finely divided state, the average size of the powder particles being about 10 µm. The composition of the powder mixture, in percentage by weight, was as follows:

Ti: 30%
Mo: 10%
Yb: 1%
B: 2.0%
Si: balance needed in order to reach 100%.

The powder mixture was put into suspension in water to enable it to be brushed onto the surface of the samples. After drying in air for 40 minutes, heat treatment was performed in a vacuum (about 0.65 Pa) at a temperature of 1420° C. for 8 minutes.

The thickness of the coating lay in the range 90 µm to 110 µm on the various samples.

Thereafter, oxidation in atmospheric air was performed at a temperature of 1300° C. for 30 minutes, resulting in a surface oxide film being formed.

Diffusion annealing steps were performed for 1 hour and for 25 hours at 1450° C. under argon.

An examination of the layers making up the deposit both before and after the annealing steps showed that the coating was very stable.

The diffusion annealing step affected the composition of the various layers of the coating little, regardless of the length of the treatment time.

On samples of the same type, isothermal oxidation tests were performed at 1450° C.

Thermogravimetric analysis showed that this type of coating has better behavior than known coatings.

Oxidation takes place slowly and conditions rapidly become linear. Thus, after 10 hours, mass variation was slightly less than 1 mg/cm$^2$.

EXAMPLE 6

Two alloys liable to self-ignition because of a low ignition temperature and high combustion heat, were tested. To this end, samples were made firstly of a niobium based alloy and secondly of a titanium based alloy.

The niobium based alloy samples had the same composition as in Example 1, and the coating layer having a thickness of 80 μm was prepared in identical manner:it was brushed on and then subjected to heat treatments.

The samples of titanium based alloy used the alloy known as TA6V and they were covered in a layer having the following composition:

Ti: 30%
Mo: 10%
Y: 0.3%
B: 2.0%
Cr: 4%
Si: balance needed in order to reach 100%.

However, the composition was deposited in two different ways:

deposition by detonation spraying, giving a coating having a thickness of 40 μm to 60 μm; and deposition by cold supersonic spraying, giving a coating thickness of about 10 μm.

There was no subsequent heat treatment.

In all cases, the samples were disks having a diameter of 13 mm and a thickness of 6 mm, and they were coated on one face.

The compatibility test used was an adiabatic compression test under oxygen (O$_2$) at high pressure in application of the standard NF E 29-690.

General conditions were as follows:

initial O$_2$ temperature: 60° C.

maximum O$_2$ pressure: 30 MPa number of cycles: 20.

For the batch of niobium-based alloy samples and for both batches of titanium-based alloy samples, no combustion was observed. It should be emphasized that rapid adiabatic compression of gaseous oxygen gives rise to very great heating of the test pieces, such as 1420° C. at the final pressure of 30 MPa.

The ignition temperature of unprotected titanium alloy under high oxygen pressure is normally less than 600° C.

The coating is therefore entirely effective in providing protection against the risk of self-ignition.

EXAMPLE 7

An aqueous suspension was made of a mixture of powders having the following composition (percentage by weight):

Ti: 30%
Mo: 10%
Cr: 0.2%
Y: 0.5%
B: 2.0%
Fe: 7%
Si: balance needed in order to reach 85%. The mixture was therefore lacking 15% silicon.

A composite material test piece made of C—SiC (carbon fiber reinforcement and SiC matrix) having a porosity of about 10% was used. It was impregnated by being dipped under a vacuum, filling its pores and simultaneously coating the surface of the material with the composition, and it was then baked at 120° C. for half an hour to eliminate the water.

In a vacuum furnace, elemental silicon was heated in a crucible to a temperature of 1440° C. The silicon was then liquid.

The test piece prepared in the above manner was then immersed in the liquid silicon, with the liquid silicon thus penetrating into the pores, and finally reacting with the powder present so as to make the initial composition up to 100%.

A composite material was thus obtained that was protected both on the surface and in bulk by the general composition as described in Example 2.

We claim:

1. A product made of refractory material protected against oxidation by a coating formed at least on the surface of the material and comprising a refractory phase interpenetrated by a healing phase, characterized in that the refractory phase is formed mainly by the refractory silicide Ti$_{(0.4-0.95)}$Mo$_{(0.6-0.05)}$Si$_2$, and the refractory phase has a branching microstructure forming an armature within which the healing phase is distributed, which healing phase is constituted by a eutectic formed mainly of unbound silicon, of the silicide Ti$_{(0.4-0.95)}$Mo$_{(0.6-0.05)}$Si$_2$, and of at least the disilicide TiSi$_2$.

2. A product according to claim 1, characterized in that the healing phase further includes at least one disilicide MeSi$_2$, in addition to the TiSi$_2$, where Me is a metal taken from groups 3 to 8 of the periodic classification of the elements.

3. A product according to claim 2, characterized in that:

the coating further includes a surface oxide film comprising silica obtained by oxidizing silicon contained in the coating;

Me is a metal selected from Mn, Fe, Co, and Ni;

the refractory material is selected from the group consisting of:

alloys of niobium, of tantalum, of molybdenum, of tungsten, intermetallic compounds and alloys containing dispersed oxide phases; and aluminum, titanium, nickel, alloys thereof, and intermetallic compounds and alloys of the TiAl, Ti$_3$Al, TiAl$_3$, NiAl, Ni$_3$Al type, for which the coating performs an anti-ignition function on the other hand;

the refractory material is a composite material containing carbon;

the refractory material is a composite material selected from carbon—carbon and carbon-SiC composite materials.

4. A method of obtaining a product of refractory material that is protected against oxidation, according to claim 3, the method comprising the steps consisting in:

preparing a mixture containing powders having the following composition in percentage by weight:
Ti:15% to 40%

Mo: 5.0% to 30%
Cr: 0 to 8%
Y: 0% to 1.5%
B: 0% to 2.5%
Me: 0% to 10% where Me is at least one metal other than Ti, and taken from groups 3 to 8 of the periodic classification of the elements
Si: balance needed in order to reach 100% depositing the mixture on the surface of the material to be protected; and
performing at least one heat treatment under an inert atmosphere at a temperature that is not less than the melting point of the eutectic forming the healing phase; and further characterized in that:
Me is selected from Mn, Fe, Co, and Ni;
the heat treatment further includes a step performed in an oxidizing medium to form an oxide film on the surface of the coating and depositing at least one of a layer of refractory oxide on the surface of the coated material; and a layer of non-oxide ceramic on the surface of the coated material.

5. A method according to claim 4, characterized in that the composition of the mixture of powders, in percentage by weight is:
Ti: about 30%.
Mo: about 10%
Cr: about 0.2%
Y: about 0.5%
B: about 2%
Me: about 7%
Si: balance needed in order to reach 100%.

6. A method according to claim 5, characterized in that:
Me is iron; and further characterized by at least one of:
the mixture of powders being put into suspension in a liquid for the purpose of being deposited on the surface of the refractory material; and
the mixture of powders being deposited on the surface of the material by a method selected from cold supersonic spraying, explosion spraying, and plasma spraying.

7. A product according to claim 1, characterized in that the coating further includes a surface oxide film comprising silica obtained by oxidizing silicon contained in the coating.

8. A product according to claim 1, characterized in that Me is a metal selected from Mn, Fe, Co, and Ni.

9. A product according to claim 1, characterized in that the coating further comprises boron and/or yttrium in combined form.

10. A product according to claim 9, characterized in that the coating includes yttrium disilicide $YSi_2$.

11. A product according to claim 9, characterized in that the coating includes titanium bodde and/or yttrium boride.

12. A product according to claim 10, characterized in that the coating includes titanium boride and/or yttrium boride.

13. A product according to claim 1, characterized in that the refractory material is selected from alloys of niobium, of tantalum, of molybdenum, of tungsten, intermetallic compounds and alloys containing dispersed oxide phases.

14. A product according to claim 1, characterized in that the refractory material is selected from aluminum, titanium, nickel, alloys thereof, and intermetallic compounds and alloys of the TiAl, $Ti_3Al$, $TiAl_3$, NiAl, $Ni_3Al$ type, for which the coating performs an anti-ignition function.

15. A product according to claim 1, characterized in that the refractory material is a composite material containing carbon.

16. A product according to claim 1, characterized in that the refractory material is a composite material selected from carbon—carbon and carbon-SiC composite materials.

17. A method of obtaining a product of refractory material that is protected against oxidation, according to claim 1, the method comprising the steps consisting in:
preparing a mixture containing powders having the following composition in percentage by weight:
Ti: 15% to 40%
Mo: 5.0% to 30%
Cr: 0 to 8%
Y: 0% to 1.5%
B: 0% to 2.5%
Me: 0% to 10% where Me is at least one metal other than Ti, and taken from groups 3 to 8 of the periodic classification of the elements
Si: balance needed in order to reach 100%
depositing the mixture on the surface of the material to be protected; and
performing at least one heat treatment under an inert atmosphere at a temperature that is not less than the melting point of the eutectic forming the healing phase.

18. A method according to claim 17, characterized in that Me is selected from Mn, Fe, Co, and Ni.

19. A method according to claim 17, characterized in that the heat treatment further includes a step performed in an oxidizing medium to form an oxide film on the surface of the coating.

20. A method according to claim 19, characterized in that it further includes depositing a layer of refractory oxide on the surface of the coated material.

21. A method according to claim 19, characterized in that it further includes depositing a layer of non-oxide ceramic on the surface of the coated material.

22. A method according to claim 12, characterized in that the composition of the mixture of powders, in percentage by weight is:
Ti: about 30%
Mo: about 10%
Cr: about 0.2%
Y: about 0.5%
B: about 2%
Me: about 7%
Si: balance needed in order to reach 100%.

23. A method according to claim 22, characterized in that Me is iron.

24. A method according to claim 17, characterized in that the mixture of powders is put into suspension in a liquid for the purpose of being deposited on the surface of the refractory material.

25. A method according to claim 24, for obtaining a product of porous refractory material protected against oxidation, characterized in that the mixture of powders is also inserted into the accessible pores of the material.

26. A method according to claim 17, characterized in that the mixture of powders is deposited on the surface of the material by a method selected from cold supersonic spraying, explosion spraying, and plasma spraying.

27. A method according to claim 17, for obtaining a product of porous refractory material protected against oxidation, characterized in that the mixture of powders is also inserted into the accessible pores of the material.

* * * * *

UNITED STATES PATENT AND TRADEMARK OFFICE
CERTIFICATE OF CORRECTION

PATENT NO. : 5,677,060
DATED : October 14, 1997
INVENTOR(S) : Valentina Sergeevna Terentieva et al.

It is certified that error appears in the above-identified patent and that said Letters Patent is hereby corrected as shown below:

Column 2,
Line 29, "baride" should read -- boride --;
Line 38, "bath" should read -- both --;

Column 11,
Line 53, "bodde" should read -- boride --;

Column 12,
Line 37, "claim 12" should read -- claim 17 --.

Signed and Sealed this

Thirtieth Day of April, 2002

Attest:

JAMES E. ROGAN
Attesting Officer    Director of the United States Patent and Trademark Office